US012623512B2

(12) United States Patent
Chapeau

(10) Patent No.: US 12,623,512 B2
(45) Date of Patent: May 12, 2026

(54) TRANSPORT REFRIGERATION SYSTEM WITH A THERMAL MANAGEMENT SYSTEM

(71) Applicant: Carrier Corporation, Palm Beach Gardens, FL (US)

(72) Inventor: Lucas Chapeau, Franqueville Saint Pierre (FR)

(73) Assignee: CARRIER CORPORATION, Palm Beach Gardens, FL (US)

( * ) Notice: Subject to any disclaimer, the term of this patent is extended or adjusted under 35 U.S.C. 154(b) by 171 days.

(21) Appl. No.: 18/361,694

(22) Filed: Jul. 28, 2023

(65) Prior Publication Data

US 2024/0034128 A1 Feb. 1, 2024

(30) Foreign Application Priority Data

Jul. 29, 2022 (EP) ..................................... 22187958

(51) Int. Cl.
*B60H 1/32* (2006.01)
*B60H 1/00* (2006.01)

(52) U.S. Cl.
CPC ..... *B60H 1/32281* (2019.05); *B60H 1/00271* (2013.01); *B60H 1/00899* (2013.01)

(58) Field of Classification Search
CPC .............. B60H 1/3232; B60H 1/00899; B60H 1/00271; B60H 1/00278; B60H 1/32281; F25B 25/005; F25D 11/003
See application file for complete search history.

(56) References Cited

U.S. PATENT DOCUMENTS

2008/0302113 A1    12/2008  Yin
2014/0070013 A1*    3/2014  Stanek ................... B60L 1/003
                                                              237/28
(Continued)

FOREIGN PATENT DOCUMENTS

CN          107860210 A  *  3/2018  ............... A23B 2/90
DE     102016111777 A1     1/2017
(Continued)

OTHER PUBLICATIONS

18361694_2025-08-23_CN_107860210_A_M.pdf Year: 2017.*
Extended European Search Report received for EP Application No. 22187958.8, mailed on Jan. 16, 2023, 07 Pages.

*Primary Examiner* — Frantz F Jules
*Assistant Examiner* — Martha Tadesse
(74) *Attorney, Agent, or Firm* — Souad Hakim

(57) ABSTRACT

A transport refrigeration system comprises a refrigeration circuit and a thermal management system. The refrigeration circuit comprises a compressor, a high pressure side heat exchanger on a high pressure side of the compressor, and a low pressure side heat exchanger on a low pressure side of the compressor. The thermal management system comprises a high pressure side fluid circuit comprising a first pump circulating a working fluid, and a first component heat exchanger for heating and/or cooling a first electronic component. The thermal management system also comprises a low pressure side fluid circuit comprising a second pump circulating a working fluid, and a second component heat exchanger for cooling a second electronic component. The high pressure side fluid circuit is in a heat exchange relationship with the refrigeration circuit, and the low pressure side fluid circuit is in a heat exchange relationship with the refrigeration circuit.

20 Claims, 6 Drawing Sheets

(56)                    References Cited

U.S. PATENT DOCUMENTS

2017/0008407 A1 *   1/2017   Porras ..................... B60L 58/26
2017/0227260 A1     8/2017   Takayama

FOREIGN PATENT DOCUMENTS

DE      112016007113 T5   4/2019
EP          3444542 A1   2/2019
WO    WO-2011124847 A1 * 10/2011   ......... H01M 10/482
WO       2018042859 A1   3/2018

* cited by examiner

TRANSPORT REFRIGERATION SYSTEM WITH A THERMAL MANAGEMENT SYSTEM

CROSS REFERENCE TO RELATED APPLICATIONS

This application claims priority to EP Patent Application No. 22187958.8 filed on Jul. 29, 2022, which is incorporated by reference herein in its entirety.

BACKGROUND

The invention relates to a transport refrigeration system, and more particularly to a transport refrigeration system having a thermal management system for controlling the temperature of electronic components of the transport refrigeration system.

Typically, transport refrigeration systems include a refrigeration circuit that is utilised to control the temperature of an enclosed compartment in order to ensure there is no damage or spoilage to temperature-sensitive cargo. At various stages during the refrigeration cycle in the refrigeration circuit, heat is absorbed or lost by a refrigerant flowing through the system.

In conventional transport refrigeration systems, the temperatures of electronic components need to be tightly controlled in order for the system to operate effectively (if at all). This can be of particular importance in electric refrigeration systems which use batteries to provide electrical power to the refrigeration system, since it may be necessary to maintain the batteries within a temperature range suitable for operation. For instance, in some conventional battery modules the batteries are unable to charge when their internal cell temperature falls below a certain temperature (e.g. below 0° C.) and are unable to provide power at all (discharge) once their internal cell temperature falls below an even lower temperature (e.g. below −10° C.). At high temperatures, the batteries may stop working or become damaged. The specific operational temperature range of a battery depends on the type of battery, and its chemistry. For instance, it is generally desired to maintain lithium iron phosphate (LFP) battery cells within a temperature range of between 5° C. and 35° C.

It may also be necessary to keep other electronic components of the refrigeration system, such as power electronic modules (e.g. power semiconductor device assemblies), cool to avoid overheating and/or damaging the components.

SUMMARY

According to a first aspect of the invention, there is provided a transport refrigeration system comprising: a refrigeration circuit comprising a compressor for compressing a refrigerant, a high pressure side heat exchanger arranged on a high pressure side of the compressor for removing heat from the refrigerant, and a low pressure side heat exchanger arranged on a low pressure side of the compressor for heating the refrigerant; and a thermal management system comprising: a high pressure side fluid circuit comprising a first pump for circulating a working fluid around the high pressure side fluid circuit, and a first component heat exchanger for heating and/or cooling a first electronic component, wherein the high pressure side fluid circuit is arranged in a heat exchange relationship with the refrigeration circuit via the high pressure side heat exchanger for heating the working fluid within the high pressure side fluid circuit; and a low pressure side fluid circuit comprising a second pump for circulating a working fluid around the low pressure side fluid circuit, and a second component heat exchanger for cooling (and/or heating) a second electronic component, wherein the low pressure side fluid circuit is arranged in a heat exchange relationship with the refrigeration circuit via the low pressure side heat exchanger for cooling the working fluid within the low pressure side fluid circuit.

BRIEF DESCRIPTION OF THE FIGURES

Certain preferred embodiments of the present invention will now be described, by way of example only, with reference to the following drawings, in which.

DETAILED DESCRIPTION

Figure 1:
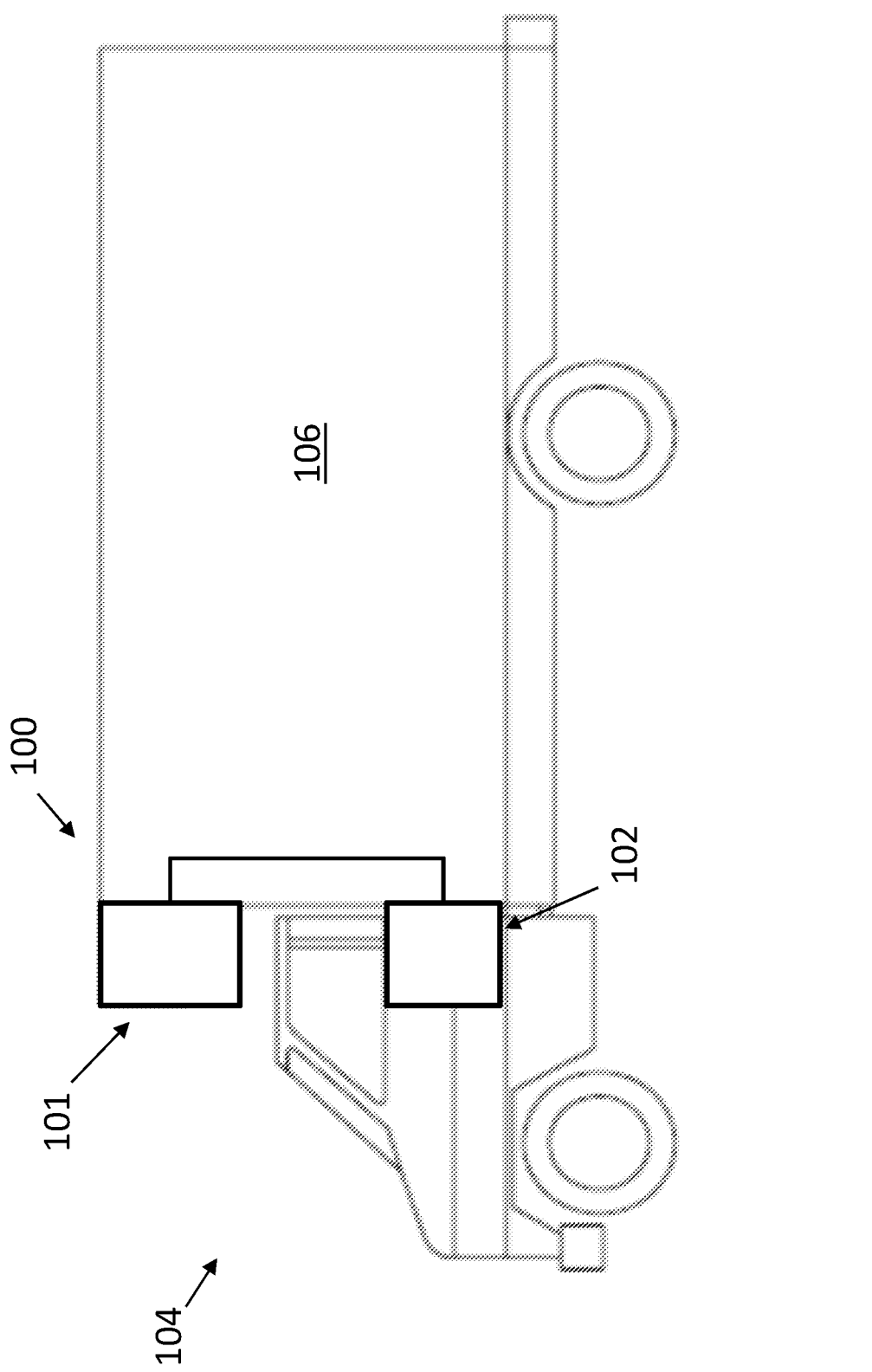
FIG. 1 is a schematic diagram of a refrigerated cargo vehicle having a transport refrigeration system.

The temperature of the refrigerant in the refrigeration circuit of the transport refrigeration system will be different at different points as it circulates around the refrigeration circuit. Advantageously, with the present invention the temperature of the refrigerant can be utilised by the thermal management system to control the temperature of electronic components.

For instance, in a situation where a first electronic component is too cold, the first pump can be operated to circulate a working fluid around the high pressure side fluid circuit. As a result, working fluid will flow from the high pressure side heat exchanger, where heat is transferred to the working fluid from the high pressure refrigerant in the refrigeration circuit, to the first component heat exchanger, where heat can be transferred from the working fluid to the first component. In a situation where a second electronic component is too hot, the second pump can be operated to circulate a working fluid around the low pressure side fluid circuit. As a result, working fluid will flow from the low pressure side heat exchanger, where heat is transferred away from the working fluid and to the low pressure refrigerant in the refrigeration circuit, to the second component heat exchanger. Here, heat can be transferred from the second component to the working fluid in order to cool the second component.

The first electronic component and the second electronic component may be the same electronic component. Thus, the electronic component may be heated and cooled by the thermal management system as required, for example if the electronic component (such as a battery or fuel cell system) has a preferred operating temperature range. Alternatively, the first and second electronic components may be separate components. Accordingly, the thermal management system may be used to control the temperature of two different electronic components.

As used herein, a heat exchanger is a system used to transfer heat between a working fluid (e.g. the working fluid of the high pressure side fluid circuit and/or the low pressure side fluid circuit) and a heat source or a heat sink. In such a heat exchanger, the working fluid and the heat source/heat sink are arranged in a heat exchange relationship, such that the working fluid may transfer heat from/to the heat source/ heat sink. In other words, in a heat exchanger the working fluid may be placed in a heat exchange relationship with a heat source for heating the working fluid, or placed in a heat exchange relationship with a heat sink for cooling the working fluid.

The heat source/heat sink may be a fluid, such as a liquid or gas. For example, in the high pressure side heat exchanger and/or the low pressure side heat exchanger, the heat source/ heat sink may be a liquid such as a refrigerant of the refrigeration circuit. As another example, in the first component heat exchanger and/or the second component heat exchanger, the heat source/heat sink may be air. Accordingly, depending on the selection of the working fluids and heat source/heat sink, a heat exchanger may be referred to as a liquid-liquid heat exchanger or a liquid-air heat exchanger.

Alternatively, the heat source/heat sink may be a component, such as an electrical component, of the transport refrigeration system, and the working fluid may be arranged in a direct heat exchange relationship with the component for cooling/heating the component.

The thermal management system may comprise connection piping (e.g. one or more connection pipes) fluidly connecting the high pressure side and low pressure side fluid circuits. In this way, working fluid from the low pressure side fluid circuit may be passed to the high pressure side fluid circuit (and vice versa) via the connection piping. Thus, the working fluid of the high pressure side fluid circuit may be interchangeable with the working fluid of the low pressure side fluid circuits, typically being the same type of fluid.

The thermal management system may comprise a controllable valve assembly arranged to selectively allow (or prevent) a working fluid to pass between the high pressure side and low pressure side fluid circuits via the connection piping.

The controllable valve assembly may be configurable in a first configuration in which working fluid is prevented from passing between the high pressure side and low pressure side fluid circuits via the connection piping. In the first configuration, the valve assembly may permit working fluid to circulate around the high pressure side and/or low pressure side fluid circuits. That is, in the first configuration, the valve assembly may not prevent working fluid from circulating around the high pressure side fluid circuit and/or the low pressure side fluid circuit.

The controllable valve assembly may be configurable in a second configuration in which working fluid is able to pass from the low pressure side fluid circuit to the high pressure side fluid circuit (in particular the first component heat exchanger of the high pressure side fluid circuit), and vice versa, via the connection piping.

The controllable valve assembly may be configured for selectively switching between the first configuration and the second configuration. In this way, flow of working fluid between the high pressure side and low pressure side fluid circuits may be controlled.

With the controllable valve assembly described above, the first component heat exchanger may advantageously be used for both heating and cooling the first component. When (relatively warm) working fluid from the high pressure side heat exchanger is passed through the first component heat exchanger, it can be used to transfer heat to the first component. Alternatively, when (relatively cool) working fluid from the low pressure side heat exchanger is passed through the first component heat exchanger it can be used to transfer heat away from the first component. Thus, the temperature of the first component may be maintained, via control of the controllable valve assembly, within a desired temperature range. That is, when it is too hot the first component may be cooled, and when it is too cold it may be heated.

The connection piping and the controllable valve assembly may be arranged such that, in the second configuration, working fluid from the low pressure side fluid circuit (e.g. working fluid from the low pressure side heat exchanger) may be passed to the first component heat exchanger and then back to the low pressure side fluid circuit without being passed to the high pressure side heat exchanger and/or the first pump.

The connection piping and/or the controllable valve assembly may be arranged such that working fluid that is passed to the high pressure side fluid circuit from the low pressure side fluid circuit is taken from upstream of the second component heat exchanger. In this way, the working fluid is not heated through heat exchange with the second electronic component before it is sent to the high pressure side fluid circuit, thereby improving the capacity of the working fluid to cool the first electronic component.

The connection piping and/or the controllable valve assembly may be arranged such that working fluid from the high pressure side fluid circuit is passed to the low pressure side fluid circuit downstream of the second component heat exchanger. In this way, relatively warm working fluid that has been heated (e.g. through heat exchange relationship with the first electronic component) is not passed to the second component heat exchanger, thereby improving the capacity of the working fluid to cool the second electronic component.

The controllable valve assembly may comprise first and second three-way valves.

The first three-way valve may comprise a first port, a second port and a third port.

The first port of the first three-way valve may be in fluid communication with the high pressure side fluid circuit upstream of the high pressure side heat exchanger.

The second port of the first three-way valve may be in fluid communication with a first side of the first component heat exchanger.

The third port of the first three-way valve may be in fluid communication with the low pressure side fluid circuit via a first connection pipe. Preferably, the third port of the first three-way valve is in fluid communication with the low pressure side fluid circuit downstream of the low pressure side heat exchanger and upstream of the second component heat exchanger.

The second three-way valve may comprise a first port, a second port and a third port.

The first port of the second three-way valve may be in fluid communication with the high pressure side fluid circuit downstream of the high pressure side heat exchanger.

The second port of the second three-way valve may be in fluid communication with a second side of the first component heat exchanger.

The third port of the second three-way valve may be in fluid communication with the low pressure side fluid circuit via a second connection pipe. Preferably, the third port of the second three-way valve is arranged in fluid communication with the low pressure side fluid circuit downstream of the second component heat exchanger and upstream of the low pressure side heat exchanger.

In the first configuration of the valve assembly, the third ports of the first and second three-way valves may be closed and the first and second port of each of the three-way valves may be open. In the second configuration of the valve assembly, the first ports of the first and second three-way valves may be closed and the second and third ports of the valves may be open. The valves may be controlled in order to selectively switch the valve assembly between the first and second configurations.

Alternatively, the controllable valve assembly may comprise a (single) six-way valve comprising a first port, a second port, a third port, a fourth port, a fifth port, and a sixth port.

The first port of the six-way valve may be in fluid communication with the high pressure side circuit upstream of the high pressure side heat exchanger.

The second port of the six-way valve may be in fluid communication with a first side of the first component heat exchanger.

The third port of the six-way valve may be in fluid communication with the low pressure side circuit via a first connection pipe. Preferably, the third port of the six-way valve is arranged in fluid communication with the low pressure side circuit downstream of the low pressure side heat exchanger and upstream of the second component heat exchanger.

The fourth port of the six-way valve may be in fluid communication with the high pressure side circuit downstream of the high pressure side heat exchanger.

The fifth port of the six-way valve may be in fluid communication with a second side of the first component heat exchanger.

The sixth port of the six-way valve may be in fluid communication with the low pressure side circuit via a second connection pipe. Preferably, the sixth port of the six-way valve is in fluid communication with the low pressure side circuit downstream of the second component heat exchanger and upstream of the low pressure side heat exchanger.

In the first configuration of the valve assembly, the third port and sixth port of the six-way valve may be closed and the first, second, fourth and fifth ports may be open. In the second configuration of the valve assembly, the first port and the fourth port of the six-way valve may be closed and the second, third, fifth and sixth ports may be open. The six-way valve may be controlled in order to selectively switch the valve assembly between the first and second configurations.

The refrigeration circuit may comprise a heat rejecting heat exchanger (condenser) for removing heat from a refrigerant. The heat rejecting heat exchanger may be arranged on the high pressure side of the compressor for receiving a high pressure refrigerant output by the compressor.

The refrigeration circuit may comprise an expansion device for reducing the pressure of a refrigerant. The expansion device may be arranged downstream of the heat rejecting heat exchanger for receiving a cooled refrigerant output by the heat rejecting heat exchanger.

The refrigeration circuit may comprise a heat absorbing heat exchanger (evaporator) for heating a refrigerant. The heat absorbing heat exchanger may be arranged downstream of the expansion device for receiving a low pressure refrigerant output by the expansion device. An output of the heat absorbing heat exchanger may be fluidly coupled to an input of the compressor.

The refrigeration circuit may comprise at least one of a suction line connecting the heat absorbing heat exchanger to the compressor, a discharge line connecting the compressor to the heat rejecting heat exchanger, and a liquid line connecting the heat rejecting heat exchanger to the expansion device.

In use, the compressor acts to pump refrigerant around the refrigeration circuit, and refrigerant may flow from the compressor to the heat rejecting heat exchanger, to the expansion valve, to the heat absorbing heat exchanger, and back to the compressor in a closed loop.

In the refrigeration circuit, the high pressure side heat exchanger may be arranged upstream of the heat rejecting heat exchanger, or downstream of the heat rejecting heat exchanger. The high pressure side heat exchanger may be arranged in the discharge line.

In the refrigeration circuit, the low pressure side heat exchanger may be arranged downstream of the heat absorbing heat exchanger, or upstream of the heat absorbing heat exchanger. The low pressure side heat exchanger may be arranged in the suction line.

The refrigeration circuit may comprise a bypass line arranged to direct refrigerant output by the heat rejecting heat exchanger to the low pressure side of the compressor, e.g. downstream of the heat absorbing heat exchanger. Thus, the bypass line may provide a flow path for refrigerant to bypass the expansion device and the heat absorbing heat exchanger.

The bypass line may comprise a flow control valve for controlling the flow rate and pressure of refrigerant in the bypass line. The low pressure side heat exchanger may be arranged in the bypass line, preferably downstream of the flow control valve.

When the compressor is in use and the flow control valve is open, at least a portion of the refrigerant circulating in the refrigeration circuit may flow through the flow control valve (thus bypassing the expansion valve and the heat absorbing heat exchanger). The flow control valve may be configured so that when it is closed, no refrigerant may flow through the bypass line.

Advantageously, by arranging the low pressure side heat exchanger in a bypass line that bypasses the expansion device, the refrigerant will enter the low pressure side heat exchanger in a mostly liquid state (i.e. the majority of the refrigerant that enters the low pressure side heat exchanger will be liquid). When the refrigerant is placed in a heat exchange relationship with the working fluid of the low pressure side fluid circuit (i.e. in the low pressure side heat exchanger), it may absorb enough heat from the working fluid in order to evaporate (i.e. the latent heat of vaporisation may be removed from the working fluid and added to the liquid refrigerant to cause it to evaporate). That is, at least some of the refrigerant may be caused to change state (i.e. from liquid to gas) through a heat exchange relationship with the working fluid. In order to change state, the liquid refrigerant must absorb a relatively large amount of energy. This leads to a high degree of cooling of the working fluid compared to a heat exchange relationship where there is no change in phase of the refrigerant (e.g. where the refrigerant remains in a gas phase).

In the alternative arrangement discussed above in which the low pressure side heat exchanger is arranged in the suction line (i.e. downstream of the heat absorbing heat exchanger), a smaller proportion of the refrigerant received by the low pressure side heat exchanger may be in the liquid state. As a result, less energy is needed to heat the refrigerant, and less energy can be extracted from the working fluid. Whilst this arrangement results in the working fluid being cooled, it has a lower capacity to cool the working fluid compared to the arrangement in which the low pressure side heat exchanger is arranged in the bypass line.

The refrigeration circuit may comprise an accumulator for collecting refrigerant. The accumulator may be arranged downstream of the heat rejecting heat exchanger. The accumulator may be arranged on, or arranged as forming part of, the liquid line. The accumulator may make it possible to control the flow of liquid to the heat absorbing heat exchanger and/or bypass line. The quantity of liquid refrigerant within the refrigeration circuit may fluctuate due to variations in cooling and heating via e.g. the heat absorbing heat exchanger and/or the heat rejecting heat exchanger. These variations may increase in magnitude when the thermal management system is being used to heat and/or cool electronic components. The accumulator may be used to contain excessive liquid refrigerant and feed it back into circulation at a suitable rate.

The bypass line may be arranged downstream of the accumulator. In this way, liquid output from the accumulator may be passed through the bypass line.

The transport refrigeration system may be powered by electrical power. Hence, the transport refrigeration system may be an electric transport refrigeration system. The transport refrigeration system may comprise a power source for providing electrical power to the refrigeration system, e.g. to (the compressor of) the refrigeration circuit and/or the first pump and/or the second pump. Alternatively, the refrigeration system may be powered by electrical power from a power source that is also used for providing electrical power to a vehicle of the transport refrigeration system (i.e. the vehicle may be an electrical vehicle powered by electrical power from the power source). The power source may be a battery system or a fuel cell system. The battery system may comprise one or more lithium iron phosphate (LFP) batteries.

The transport refrigeration system may comprise first and/or second electronic components. The thermal management system may be configured to control the temperature of the first and/or second electronic components. The first component heat exchanger may be arranged in a heat exchange relationship with the first electronic component. The second component heat exchanger may be arranged in a heat exchange relationship with the second electronic component.

The first electronic component may be a power source, e.g. the power source for providing electrical power to the transport refrigeration system. The first electronic component may be an electronic component that has a preferred operating temperature range. Advantageously, with the thermal management system of the first aspect, the first electronic component may be both heated and cooled in order to maintain a temperature of the first electronic component within a preferred/predetermined operating temperature range.

The first and/or second electronic component may be a power electronic module assembly for converting/transforming electrical power. The power electronic module assembly may include at least one of a power inverter, a power converter, a controller, a microprocessor, a resistor bank, a capacitor bank, a rectifier, and various other electrical components for storing/converting/transforming electrical power.

The transport refrigeration system may comprise a control system for obtaining temperature data and controlling operation of the transport refrigeration system.

The control system may comprise a first temperature sensor for measuring a temperature of the first electronic component.

The control system may comprise a second temperature sensor for measuring a temperature of the second electronic component.

The control system may comprise a controller for controlling the transport refrigeration system. The controller may be arranged in communication with the first and/or second temperature sensor for receiving temperature data.

The control system (i.e. the controller) may be configured to operate the pumps and/or the controllable valve assembly and/or the flow control valve based on the temperature data.

When the first electronic component is a power source, such as a fuel cell system or a battery system, the first temperature sensor may be configured to measure an internal cell temperature of the power source.

The controller may be configured to receive operational data from the power source and determine an internal cell temperature of the power source from the operational data. In this arrangement, the system may not require the first temperature sensor.

The control system may be configured to operate the first pump if a temperature of a first electronic component is determined to be less than a first threshold temperature. In other words, when the first electronic component is too cold, the control system may be configured to operate the first pump to circulate working fluid around the high pressure side fluid circuit from the high pressure side heat exchanger to the first component heat exchanger to heat the first electronic component. The first threshold temperature may be in the range −20° C. and 20° C., and preferably in the range 0° C. and 10° C.

The control system may be configured to operate the second pump if a temperature of a second electronic component is determined to exceed a second threshold temperature. In other words, when the second electronic component is too hot, the control system may be configured to operate the second pump to circulate working fluid around the low pressure side fluid circuit from the low pressure side heat exchanger to the second component heat exchanger to cool the second electronic component. The second threshold temperature may be between 50° C. and 90° C., and preferably between 70° C. and 80° C.

The control system may be configured to operate the controllable valve assembly in the second configuration and operate the second pump if a temperature of the first electronic component is determined to exceed a third threshold temperature that is higher than the first threshold temperature. In other words, when the first electronic component is too hot, the control system may be configured to operate the controllable valve assembly in the second configuration and operate the second pump to circulate working fluid from the low pressure side heat exchanger via the low pressure side fluid circuit to the first component heat exchanger to cool the first electronic component. The third threshold temperature may be between 20° C. and 50° C., and preferably between 30° C. and 40° C.

The control system may be configured to operate the controllable valve assembly in the first configuration if a temperature of the first electronic component is determined to be less than or equal to the third threshold temperature. In other words, when the first electronic component is not too hot, it does not require cooling, so the control system may be configured to prevent working fluid from passing between the high pressure side and low pressure side fluid circuits via the connection piping (which could lead to unnecessary cooling of the first electronic component and may prevent the second component from being adequately cooled).

The first component heat exchanger may be arranged for heating and/or cooling the first electronic component via conduction. For example, a fluid line of the first component heat exchanger configured for carrying working fluid may be arranged proximate to and/or surrounding the first electronic component.

The second component heat exchanger may be arranged for cooling the second electronic component via conduction. For example, a fluid line of the second component heat exchanger configured for carrying working fluid may be arranged proximate to and/or surrounding the second electronic component.

The first component heat exchanger may be arranged for heating and/or cooling the first electronic component via convection. For example, the first component heat exchanger may be a liquid-air heat exchanger arranged in a first airflow path. The first electronic component may be arranged in the first airflow path. The first airflow path may be driven by a first fan. The first fan may be arranged to drive or draw air over the first component heat exchanger and the first electronic component. In other words, the first component heat exchanger may be arranged for transferring heat between the working fluid and the air, and the first electronic component may be arranged to be heated/cooled via interaction with the heated/cooled air.

The second component heat exchanger may be arranged for cooling the second electronic component via convection. The second component heat exchanger may be a liquid-air heat exchanger arranged in a second airflow path. The second electronic component may be arranged in the second airflow path. The second airflow path may be driven by a second fan. The second fan may be arranged to drive or draw air over the second component heat exchanger and the second electronic component. In other words, the second component heat exchanger may be arranged for transferring heat between the working fluid and the air, and the second electronic component may be arranged to be cooled via interaction with the cooled air.

The thermal management system may comprise a pressure compensation system.

The pressure compensation system may be a common pressure compensation system comprising a conduit fluidly connected to the high pressure and low pressure side circuits.

The pressure compensation system may comprise an inlet for introducing working fluid into the conduit (and therefore to the high pressure and low pressure side circuits).

The pressure compensation system may comprise a pressure switch positioned on the conduit for monitoring the pressure of the working fluid in the high pressure and low pressure side circuits of the thermal management system.

The pressure compensation system may comprise an expansion tank for protecting against excessive pressure build up in the thermal management system. The expansion tank may be in fluid communication with the conduit (i.e. therefore both the high pressure and low pressure side circuits) to absorb excess pressure caused by expansion of the working fluid.

Alternatively, the thermal management system may comprise a pressure compensation system for each of the high pressure and low pressure side circuits, wherein each pressure compensation system may comprise one or more or all of the features discussed above in respect of the common pressure compensation system.

The working fluid in the high pressure side fluid circuit and low pressure side fluid circuit may be, or at least comprise, glycol.

The thermal management system may comprise a radiator. Typically, transport refrigeration systems powered by internal combustion engines may include a radiator to provide cooling for engine coolant. This radiator may still be present, although conventionally not utilised, in electric transport refrigeration systems (i.e. systems not comprising an internal combustion engine). The radiator may be fluidly connected to the low pressure side fluid circuit in order to provide additional cooling to the working fluid of the low pressure side fluid circuit. Alternatively, or additionally, the radiator may be fluidly connected to the high pressure side fluid circuit in order to provide additional heating to the working fluid of the high pressure side fluid circuit.

The radiator may be arranged in a heat exchange relationship with ambient air for heating or cooling working fluid within the radiator.

The radiator and the heat rejecting heat exchanger (condenser) of the refrigeration circuit may be arranged within a shared heat exchanger housing. The shared heat exchanger housing may be placed in the ambient air so that working fluid within the radiator may be heated or cooled by the ambient air and/or refrigerant within the heat rejecting heat exchanger may be cooled by the ambient air. Preferably, the radiator and the heat rejecting heat exchanger are not in fluid communication.

The radiator may be fluidly connected to the low pressure side fluid circuit via a low pressure side radiator valve. When the low pressure side radiator valve is open, working fluid may pass from the low pressure side fluid circuit to the radiator (and vice versa). When the low pressure side radiator valve is closed, working fluid may be prevented from passing from the low pressure side fluid circuit to the radiator (and vice versa).

The radiator may be fluidly connected to the high pressure side fluid circuit via a high pressure side radiator valve. When the high pressure side radiator valve is open, working fluid may pass from the high pressure side fluid circuit to the radiator (and vice versa). When the high pressure side radiator valve is closed, working fluid may be prevented from passing from the high pressure side fluid circuit to the radiator (and vice versa).

The shared heat exchanger housing may be arranged in an airflow path, e.g. in a flow of ambient air generated by movement of the transport refrigeration system. The transport refrigeration system may comprise a fan to drive/draw ambient air across the shared heat exchanger housing (i.e. across the radiator and the heat rejecting heat exchanger).

The control system may be configured to control the low pressure side radiator valve and/or the high pressure side radiator valve based on the temperature of the ambient air relative to the temperature of at least one of the first electronic component and the second electronic component.

The control system may be configured to open the low pressure side radiator valve when a temperature of the ambient air is below a temperature of the second electronic component and/or a temperature of the first electronic component. Thus, working fluid may be passed from the low pressure side fluid circuit (before or after being passed to the low pressure side heat exchanger) to the radiator for additional cooling of the working fluid. This additionally cooled working fluid may then be passed back to the low pressure side fluid circuit and to the second component heat exchanger and/or the first component heat exchanger for cooling the first and/or second electronic component.

The control system may be configured to open the high pressure side radiator valve when a temperature of the ambient air is above a temperature of the first electronic component. Thus, working fluid may be passed from the high pressure side fluid circuit (before or after being passed to the high pressure side heat exchanger) to the radiator for additional heating of the working fluid. The working fluid may then be passed back to the high pressure side fluid circuit and to the first component heat exchanger for heating the first electronic component.

The control system may comprise an ambient temperature sensor for measuring a temperature of the ambient air. The ambient temperature sensor may be arranged for measuring the temperature of the air adjacent to the radiator. The controller of the control system may be arranged in communication with the ambient temperature sensor for receiving temperature data from the ambient temperature sensor.

The transport refrigeration system may comprise a heater, preferably an electric heater, for heating the first electronic component. Advantageously, the heater can be used to provide additional heating to the first electronic component if/when it may be required.

For example, if the first pump of the thermal management system has been operated for a predetermined period of time, and the temperature of the first electronic component is (still) less than the first threshold temperature, then the control system may be configured to activate the heater. In other words, if the control system determines that the first electrical component is too cold even when the thermal management system has been/is being operated to provide heat to the first electrical component, the control system may activate the heater to provide additional heating. The predetermined period of time may be 2 minutes, 5 minutes, or 10 minutes.

Alternatively, or additionally, the control system may be configured to activate the heater when the temperature of the first electronic component is less than a fourth threshold temperature that is lower than the first threshold temperature. The fourth threshold temperature may be between −40° C. and 0° C., and preferably between −20° C. and −10° C.

In other words, if the control system determines that the first electronic component is significantly colder than its preferred operating temperature, then it may activate the heater (whilst the first pump is active) in order to provide increased heating. The control system may deactivate/stop operating the heater when the temperature of the first electronic component is higher than the first threshold temperature or the fourth threshold temperature, or may deactivate/stop operating the heater after a predetermined period of time, e.g. 1 minute or 5 minutes.

The invention may extend to a refrigerated cargo vehicle comprising the transport refrigeration system of the first aspect. The refrigerated cargo vehicle may comprise a container having a refrigerated compartment for storing cargo in a temperature controlled environment. The transport refrigeration system may be configured to control environmental conditions (e.g. temperature conditions) within the refrigerated compartment. The transport refrigeration system may be coupled to or mounted on the refrigerated cargo vehicle, e.g. to the container/refrigerated compartment. The refrigeration system may be in communication with the refrigerated compartment to control environmental conditions within the compartment.

The refrigerated cargo vehicle may comprise a vehicle power source for providing drive to the vehicle. The power source may be an electrical power source for providing electrical power to the vehicle. Hence, the refrigerated cargo vehicle may be an electric vehicle. The vehicle power source may be a battery system or fuel cell system. The vehicle power source may be arranged to provide power to the transport refrigeration system. Hence, the vehicle power source may be configured to power the transport refrigeration system. The first electronic component may comprise the vehicle power source.

The refrigerated cargo vehicle may comprise a regenerative braking system for converting kinetic energy into electrical energy. When the vehicle power source and/or the transport refrigeration power source is a battery system, the regenerative braking system may be coupled to one or both of the power sources for storing electrical energy generated by the regenerative braking system. Hence, the vehicle may be configured such that the power source(s) can be charged via the regenerative braking system.

According to a second aspect of the invention, there is provided a method of controlling the temperature of electronic components using the transport refrigeration system of the first aspect, wherein the first component heat exchanger is arranged for heating and/or cooling a first electronic component, and the second component heat exchanger is arranged for cooling a second electronic component, the method comprising: determining a temperature of the first electronic component; determining a temperature of the second electronic component; operating the first pump to circulate working fluid around the high pressure side fluid circuit if the temperature of the first electronic component is below a first threshold temperature; and/or operating the second pump to circulate working fluid around the low pressure side fluid circuit if the temperature of the second electronic component exceeds a second threshold temperature.

The method of the second aspect provides the same advantages of the transport refrigeration system of the first aspect, and these will not be discussed here to avoid repetition.

The method may comprise measuring the temperature(s) of the first and/or second electronic components using the first and/or second temperature sensors.

When the low pressure side heat exchanger is arranged in the bypass line of the refrigeration circuit, the method may comprise: opening the flow control valve to allow refrigerant to flow through the bypass line if the temperature of the second electronic component exceeds the second threshold temperature and/or if the temperature of the first electronic component exceeds a third threshold temperature that is higher than the first threshold temperature. Thus, when cooling is required, the refrigeration circuit may be operated so that refrigerant bypasses the expansion valve and is directed through the low pressure side heat exchanger so that the refrigerant may absorb heat from the working fluid in the low pressure side fluid circuit. In this way, the working fluid can be cooled and used to cool the second electronic component and, optionally, the first electronic component. The third threshold temperature may be the same as discussed above in respect of the first aspect.

The method may comprise operating the controllable valve assembly in the first configuration if the temperature of the first electronic component is less than or equal to the third threshold temperature.

The method may comprise operating the controllable valve assembly in the second configuration and operating the second pump if the temperature of the first electronic component exceeds the third threshold temperature.

The control system of the first aspect may be arranged to control the transport refrigeration system in accordance with the method of the second aspect. Accordingly, the method of the second aspect may be used to control operation of the transport refrigeration system described in the first aspect.

FIG. 1 shows a transport refrigeration system 100 comprising a refrigeration circuit 101 and a thermal management system 102.

The transport refrigeration system 100 is shown operably coupled to a refrigerated compartment 106 of a refrigerated cargo vehicle 104 in order to cool the refrigerated compartment 106. The transport refrigeration system 100 (in particular the refrigeration circuit 101) may be operated to maintain and/or control an internal temperature of the refrigerated compartment 106.

The transport refrigeration system 100 may be an electric transport refrigeration system which utilises electrical power to operate the refrigeration circuit 101 and other components of the transport refrigeration system 100. The transport refrigeration system 100 may comprise its own electrical power source for powering the transport refrigeration system 100, or it may utilise an external power source. For instance, if the refrigerated cargo vehicle 104 is an electric vehicle with its own electric power source, the transport refrigeration system 100 may be powered by the vehicle's power source. The power source may be a battery system or a fuel cell system.

Figure 2:
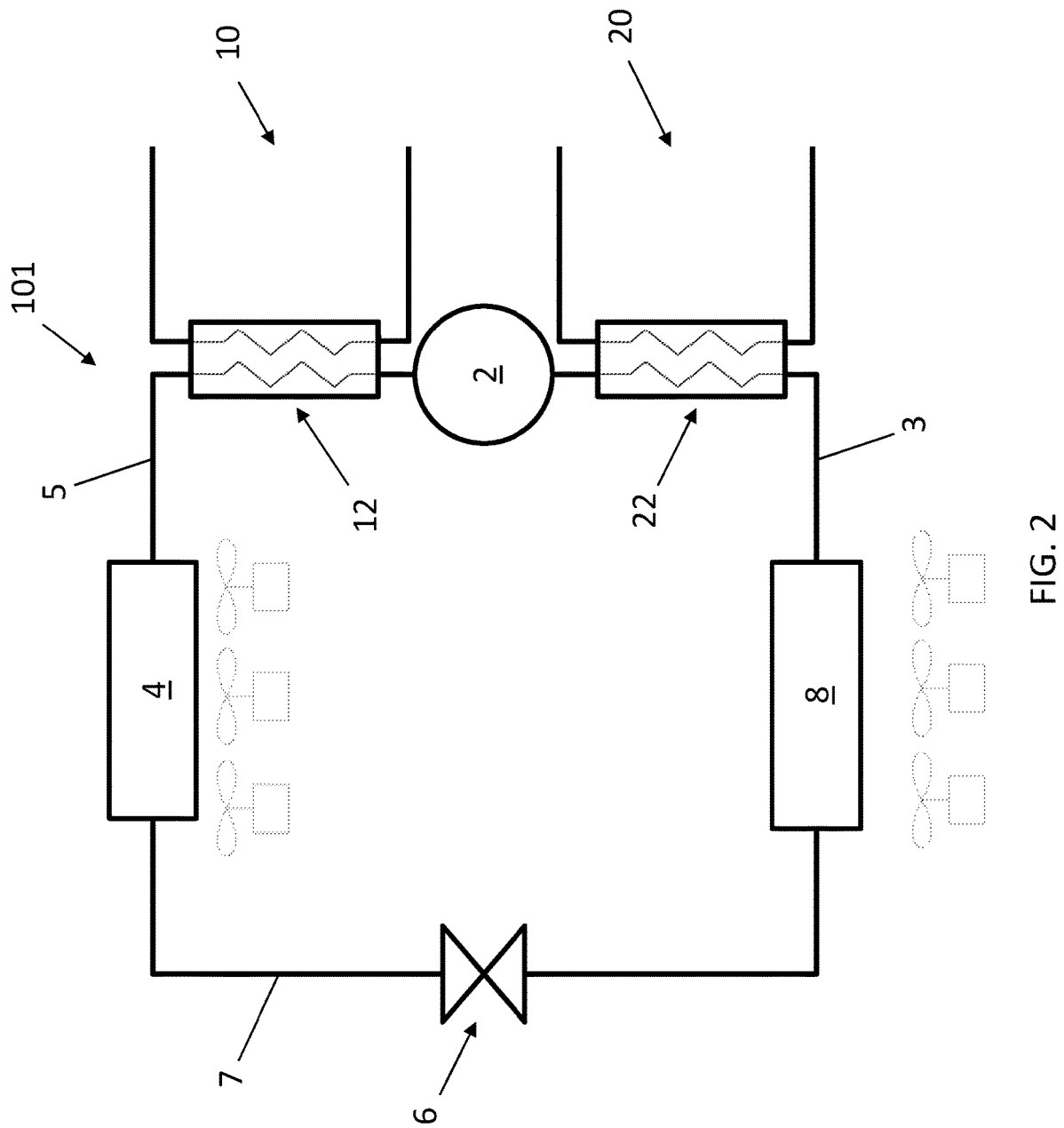
FIG. 2 is a schematic diagram of a refrigeration circuit of a transport refrigeration system having a thermal management system.

An example of the refrigeration circuit 101 is illustrated in FIG. 2. The refrigeration circuit 101 comprises a compressor 2 for compressing a refrigerant and pumping the refrigerant around the refrigeration circuit 101, a heat rejecting heat exchanger (condenser) 4 arranged on the high pressure side of the compressor 2 for removing heat from the high pressure refrigerant output by the compressor 2, an expansion device 6 arranged downstream of the heat rejecting heat exchanger 4 for reducing the pressure of the cooled refrigerant output by the heat rejecting heat exchanger 4, and a heat absorbing heat exchanger (evaporator) 8 arranged downstream of the expansion device 6 for heating the low pressure refrigerant output by the expansion device 6.

In use, the compressor 2 acts to pump refrigerant around the refrigeration circuit, and refrigerant flows from the compressor 2 to the heat rejecting heat exchanger 4, to the expansion valve 6, to the heat absorbing heat exchanger 8, and back to the compressor 2 in a closed loop in the conventional manner.

The refrigeration circuit 101 comprises a suction line 3 connecting the heat absorbing heat exchanger 8 to the compressor 2, a discharge line 5 connecting the compressor 2 to the heat rejecting heat exchanger 4, and a liquid line 7 connecting the heat rejecting heat exchanger 4 to the expansion device 6.

The refrigeration circuit 101 also comprises a high pressure side heat exchanger 12 arranged on the high pressure side of the compressor 2 and a low pressure side heat exchanger 22 arranged on the low pressure side of the compressor 2. The high pressure side heat exchanger 12 and the low pressure side heat exchanger 22 are provided so that heat energy can be transferred between the refrigeration circuit 101 and the thermal management system 102.

The high pressure side heat exchanger 12 is arranged on the discharge line 5 and the low pressure side heat exchanger 22 is arranged on the suction line 3, i.e. on the low pressure side of the compressor 2 downstream of the heat absorbing heat exchanger 8.

The thermal management system 102 is provided to help control the temperature of electronic components, and is configured to use the temperature of the refrigerant that, in use, flows through the refrigeration circuit 101 in order to provide heating and/or cooling to electronic components when necessary.

Figure 3:
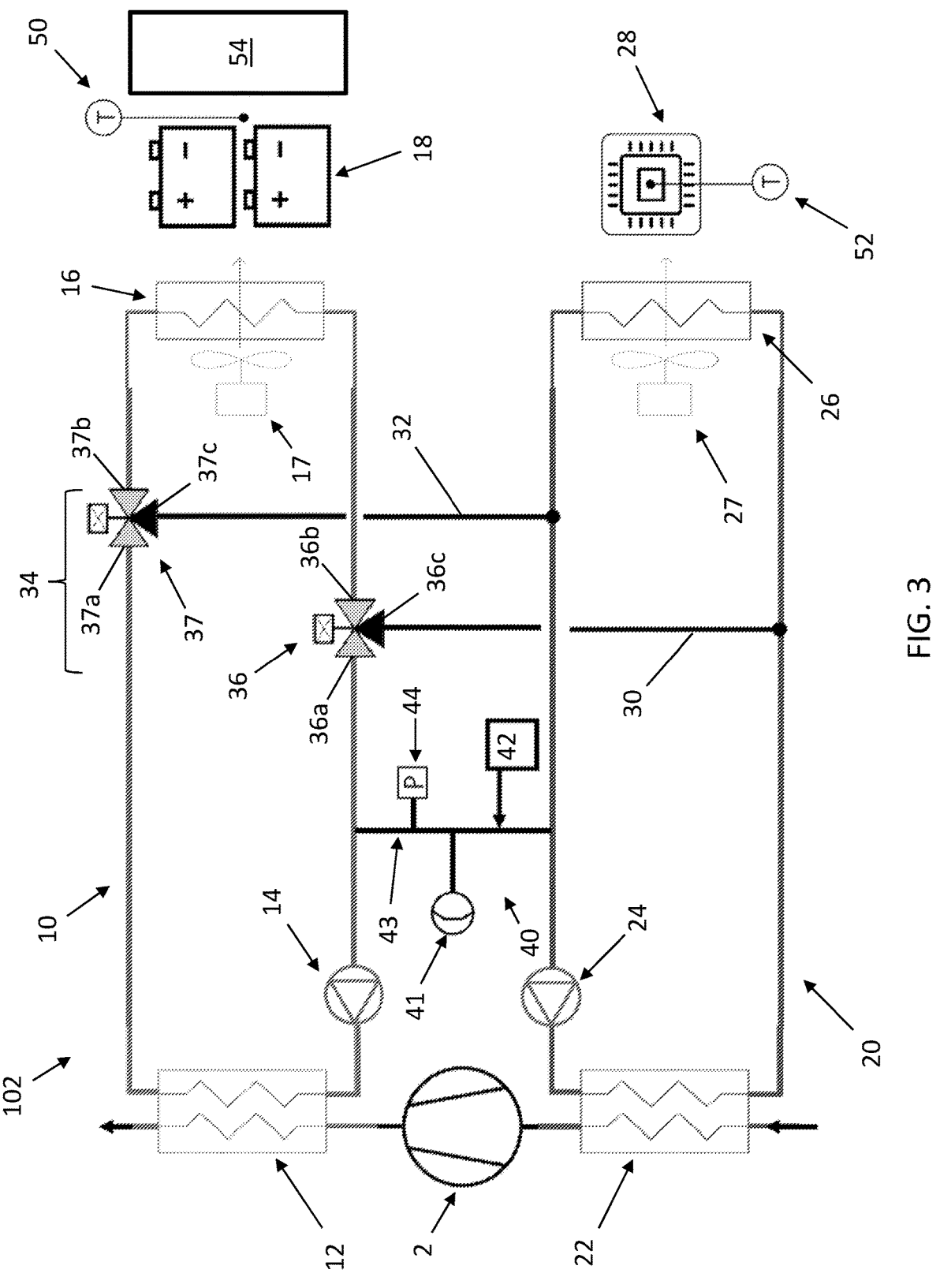
FIG. 3 is a schematic diagram of a thermal management system of a transport refrigeration system.

FIG. 3 shows the thermal management system 102 arranged in a heat exchange relationship with the refrigeration circuit 101. Only a portion of the refrigeration circuit 101 is shown in FIG. 3 in order to simplify description of the system.

The thermal management system 102 comprises a high pressure side fluid circuit 10 that is arranged in a heat exchange relationship with the refrigeration circuit 101 via the high pressure side heat exchanger 12. A working fluid, such as glycol, may circulate within the high pressure side fluid circuit 10 and through the high pressure side heat exchanger 12. In this way, heat energy can be exchanged between the refrigerant and the working fluid in the high pressure side heat exchanger 12.

The high pressure side fluid circuit 10 comprises a first pump 14 for circulating a working fluid around the high pressure side fluid circuit 10, and a first component heat exchanger 16 for heating or cooling a first electronic component. In the example shown in FIG. 3, the first electronic component is a battery system 18 used for providing the transport refrigeration system with electrical power. The battery system 18 may be used to power components of the transport refrigeration system, such as the compressor 2 and/or the thermal management system 102.

The first component heat exchanger 16 is arranged for heating or cooling the battery system 18 by convection. The first component heat exchanger 16 is a liquid-air heat exchanger and is arranged in a first airflow path that is driven by a first fan 17. The first fan 17 is arranged to drive air over the first component heat exchanger 16 and the battery system 18.

In use, refrigerant flowing within the refrigeration circuit 101 from the compressor 2 to the heat rejecting heat exchanger 4 passes through the high pressure side heat exchanger 12. The refrigerant, having been compressed in the compressor 2, will have a relatively high pressure and temperature. In the high pressure side heat exchanger 12, heat energy will be transferred from the refrigerant to the working fluid causing the refrigerant to be cooled and the working fluid to be heated. The heated working fluid is passed to the first component heat exchanger 16 by action of the first pump 14, where it can be used to heat the battery system 18.

The thermal management system also comprises a low pressure side fluid circuit 20 that is arranged in a heat exchange relationship with the refrigeration circuit 101 via the low pressure side heat exchanger 22. A working fluid, such as glycol, may circulate within the low pressure side fluid circuit 20 and through the low pressure side heat exchanger 22. In this way, heat energy can be exchanged between the refrigerant and the working fluid in the low pressure side heat exchanger 22.

The low pressure side fluid circuit 20 comprises a second pump 24 for circulating a working fluid around the low pressure side fluid circuit 20, and a second component heat exchanger 26 for cooling a second electronic component. In the system shown in FIG. 1, the second electronic component is a power electronic module assembly 28 of the transport refrigeration system.

The second component heat exchanger 26 is arranged for cooling the power electronic module assembly 28 by convection. The second component heat exchanger 26 is a liquid-air heat exchanger arranged in a second airflow path driven by a second fan 27. The second fan 27 is arranged to drive air over the second component heat exchanger 26 and the power electronic module assembly 28.

In use, refrigerant flowing within the refrigeration circuit 101 from the heat absorbing heat exchanger 8 to the compressor 2 passes through the low pressure side heat exchanger 22. The refrigerant, having been reduced in pressure by the expansion valve 6, will have a relatively low pressure and temperature. In the low pressure side heat exchanger 22, the refrigerant will absorb heat energy from the working fluid, thereby heating the refrigerant and cooling the working fluid. The cooled working fluid is passed to the second component heat exchanger 26 by action of the second pump 24, where it can be used to cool the power electronic module assembly 28.

As shown in FIG. 3, the high pressure side fluid circuit 10 and low pressure side fluid circuit 20 are fluidly connected via connection piping (first and second connection pipes 30, 32). Additionally, the thermal management system comprises a controllable valve assembly 34 arranged to selectively allow a working fluid to pass between the high pressure side and low pressure side fluid circuits 10, 20 via the first and second connection pipes 30, 32.

The controllable valve assembly 34 comprises a first three-way valve 36 comprising a first port 36a, a second port 36b and a third port 36c. The first port 36a of the first three-way valve 36 is in fluid communication with the high pressure side fluid circuit 10 upstream of the high pressure side heat exchanger 12. The second port 36b of the first three-way valve 36 is in fluid communication with a first side of the first component heat exchanger 16. The third port 36c of the first three-way valve 36 is in fluid communication with the low pressure side fluid circuit 20 downstream of the low pressure side heat exchanger 22 via the first connection pipe 30.

The controllable valve assembly 34 comprises a second three-way valve 37 comprising a first port 37a, a second port 37b and a third port 37c. The first port 37a of the second three-way valve 37 is in fluid communication with the high pressure side fluid circuit 10 downstream of the high pressure side heat exchanger 12. The second port 37b of the second three-way valve 37 is in fluid communication with a second side of the first component heat exchanger 16. The third port 37c of the second three-way valve 37 is in fluid communication with the low pressure side fluid circuit 20 upstream of the low pressure side heat exchanger 22 via the second connection pipe 32.

The valve assembly 34 is configured so that it can be switched between a first configuration and a second configuration. In a first configuration, the third ports 36c, 37c of the first and second three-way valves 36, 37 are closed, and the first ports 36a, 37a and second ports 36b, 37b are open. As a result, working fluid is not able to pass between the high and low pressure fluid circuits 10, 20 via the connection pipes 30, 32, although it is able to circulate around the high and low pressure circuits 10, 20 independently.

In a second configuration, the first ports 36a, 37a of the first and second three-way valves 36, 37 are closed, and the second ports 36b, 37b and third ports 36c, 37c are open. As a result, working fluid from the low pressure side fluid circuit 20 may pass to the high pressure side fluid circuit 10 via connection pipe 30, pass through the first component heat exchanger 16 and then be passed back to the low pressure side fluid circuit via connection pipe 32.

The valves 36, 37 are controlled in order to selectively switch the valve assembly 34 between the first and second configurations.

The transport refrigeration system 100 comprises a control system for obtaining temperature data and controlling operation of the transport refrigeration system 100. The control system comprises a first temperature sensor 50 for measuring a temperature of the battery system 18 (i.e. the first electronic component), a second temperature sensor 52 for measuring a temperature of the power electronics module assembly 28 (i.e. the second electronic component), and a controller (not shown) in communication with the first and second temperature sensors 50, 52 for receiving temperature data. The first temperature sensor is arranged to determine the internal cell temperature of the battery system 18.

The controller is configured to operate the pumps 14, 24 and/or the controllable valve assembly 34 based on the temperature data received from the first and second sensors 50, 52 (as is explained further below) in order to heat or cool the battery system 18 and/or the power electronics module assembly 28 as desired.

As shown in FIG. 3, the thermal management system comprises a (common) pressure compensation system 40 comprising an expansion tank 41 for protecting against excessive pressure build up in the thermal management system 102. The expansion tank 41 is in fluid communication with both the high pressure and low pressure side circuits 20 via a conduit 43 to absorb excess pressure caused by expansion of the working fluid. The pressure compensation system 40 also comprises an inlet 42 for introducing working fluid into the conduit 43 (and therefore to the high pressure and low pressure side circuits 10, and a pressure switch 44 for monitoring the pressure of the working fluid in the high pressure and low pressure side circuits 10, 20.

Figure 4:
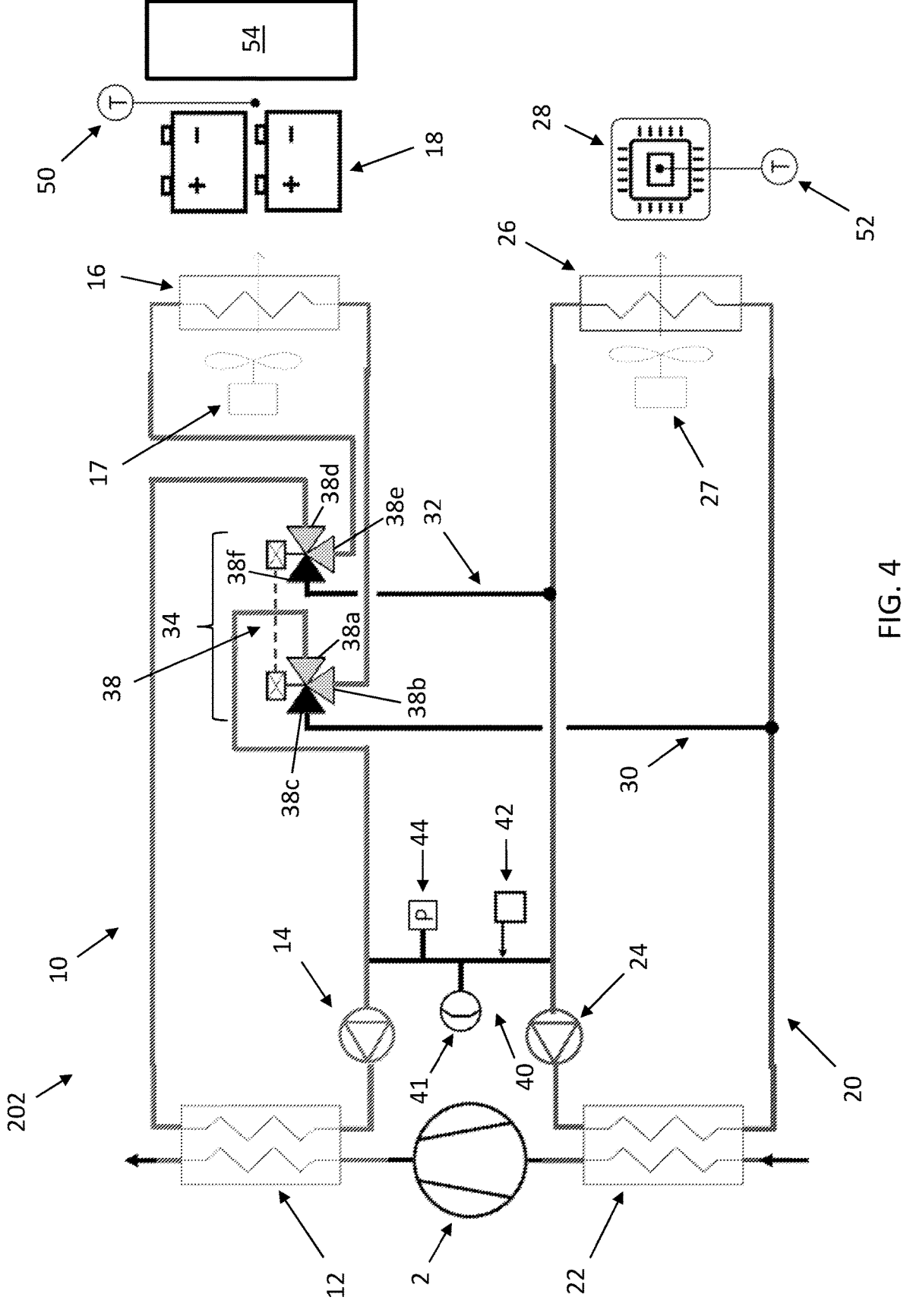
FIG. 4 is a schematic diagram of an alternative thermal management system of a transport refrigeration system.

As discussed above, the thermal management system 102 shown in FIG. 3 includes two three-way valves 36, 37 for controlling the flow of working fluid between the high and low pressure side fluid circuits. The same function can be achieved using a single six-way valve in place of the first and second three-way valves 36, 37. An alternative thermal management system 202 comprising a single six-way valve 38 is shown in FIG. 4. The thermal management system 202 shown in FIG. 4 is otherwise identical to the thermal management system 102 shown in FIG. 3, and a description of the identical features has not been provided to avoid repetition.

The six-way valve 38 comprises a first port 38a, a second port 38b, a third port 38c, a fourth port 38d, a fifth port 38e, and a sixth port 38f. The first port 38a of the six-way valve 38 is in fluid communication with the high pressure side circuit 10 upstream of the high pressure side heat exchanger 12. The second port 38b of the six-way valve 38 is in fluid communication with a first side of the first component heat exchanger 16. The third port 38c of the six-way valve 38 is in fluid communication with the low pressure side fluid circuit 20 downstream of the low pressure side heat exchanger 22 via the first connection pipe 30. The fourth port 38d of the six-way valve 38 is in fluid communication with the high pressure side circuit 10 downstream of the high pressure side heat exchanger 12. The fifth port 38e of the six-way valve 38 is in fluid communication with a second side of the first component heat exchanger 16. The sixth port 38f of the six-way valve 38 is in fluid communication with the low pressure side fluid circuit 20 upstream of the low pressure side heat exchanger 22 via the second connection pipe 32.

The six-way valve 38 functions similarly to the two three-way valves 36, 37 shown in FIG. 3, and can be operated in a first configuration to prevent fluid communication between the high and low pressure fluid circuits 10, 20 via the connection pipes 30, 32 and a second configuration which permits fluid communication between the high and low pressure fluid circuits 10, 20 via the connection pipes 30, 32.

In the first configuration, the third port 38c and sixth port 38f of the six-way valve 38 are closed and the first port 38a, second port 38b, fourth port 38d and fifth port 38e are open. As a result, working fluid is not able to pass between the high and low pressure fluid circuits 10, 20 via the connection pipes 30, 32, although working fluid is able to circulate around the high and low pressure circuits 10, 20 independently.

In the second configuration, the first port 38a and the fourth port 38d of the six-way valve 38 are closed, and the second port 38b, third port 38c, fifth port 38e and sixth port 38f are open. As a result, working fluid from the low pressure side fluid circuit 20 may pass to the high pressure side fluid circuit 10 via connection pipe 30, pass through the first component heat exchanger 16 and then be passed back to the low pressure side fluid circuit 20 via connection pipe 32.

Similar to the three-way valves 36, 37 shown in FIG. 3, the six-way valve 38 can be controlled to selectively switch the valve assembly 34 between the first and second configurations.

The transport refrigeration system 100 can also include an (electric) heater 54 adjacent to the battery system 18 for providing additional heating to the battery system 18. This may be needed, for example, if the heat from the high pressure side fluid circuit 10 (i.e. the first component heat exchanger 16) is not sufficient to raise the temperature of the battery system 18 to a required temperature, or if there is a desire to speed up heating of the battery system 18. The control system is configured to control operation of the heater 54.

Figure 5:
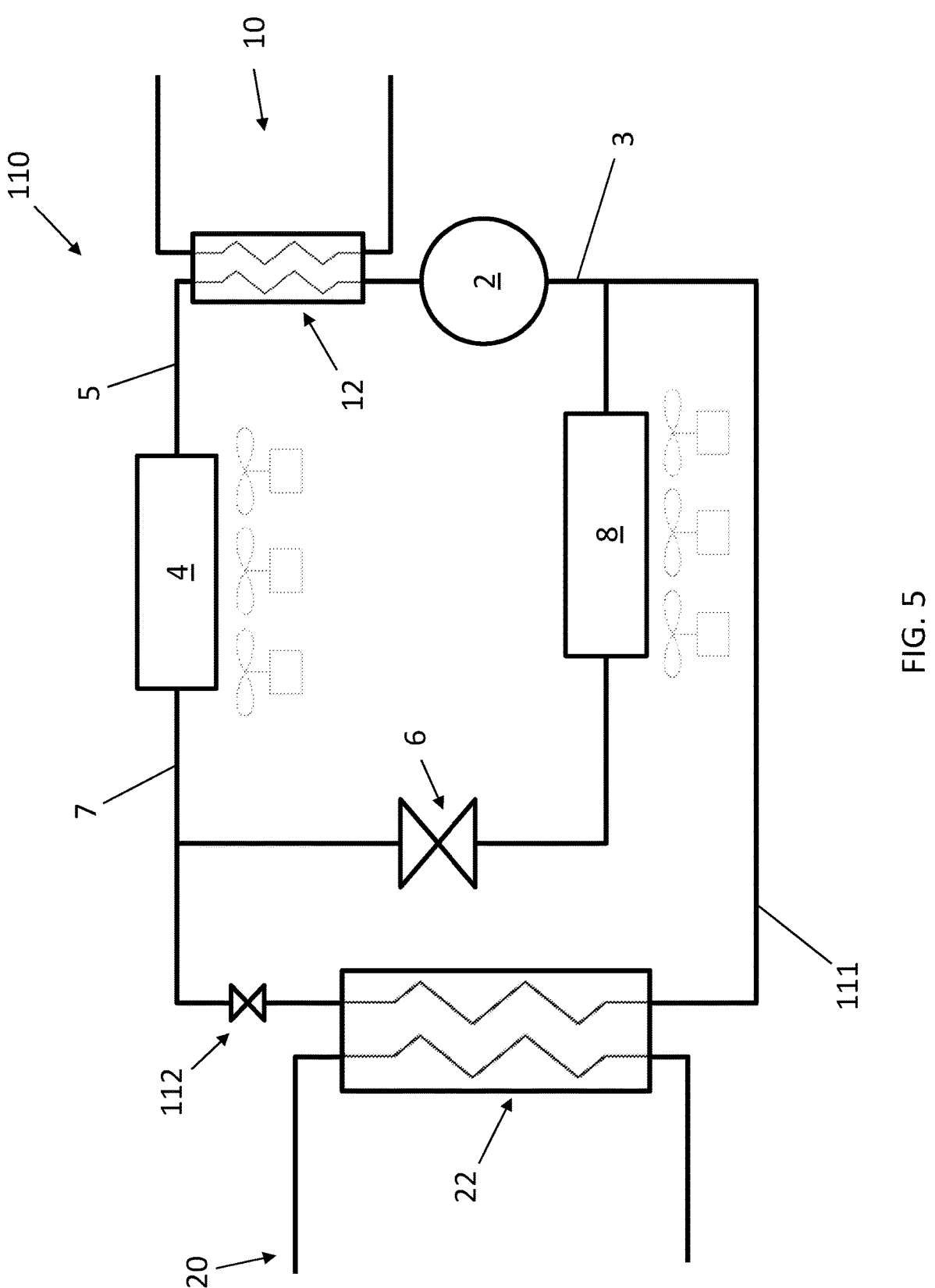
FIG. 5 is a schematic diagram of an alternative refrigeration circuit of a transport refrigeration system having a thermal management system.

Another example of a refrigeration circuit 110 is shown in FIG. 5. Many of the features of the refrigeration circuit 110 are the same as refrigeration circuit 101 and will not be described here to avoid repetition. However, the refrigeration circuit 110 differs from the refrigeration circuit 101 with regard to the location of the low pressure side heat exchanger 22.

Refrigeration circuit 110 comprises a bypass line 111 arranged to direct refrigerant output by the heat rejecting heat exchanger 4 to the low pressure side of the compressor 2 downstream of the heat absorbing heat exchanger 8. The bypass line 111 therefore provides a flow path for refrigerant to bypass the expansion device 6 and the heat absorbing heat exchanger 8.

The bypass line 111 comprises a flow control valve 112 for controlling the flow rate and pressure of refrigerant in the bypass line 111. In refrigeration circuit 110, the low pressure side heat exchanger 22 is arranged in the bypass line 111 downstream of the flow control valve 112.

In use, when the compressor 2 is operating and the flow control valve 112 is open, at least a portion of the refrigerant circulating in the refrigeration circuit 110 flows through the flow control valve 112 and the bypass line 111 (thus bypassing the expansion valve 6 and the heat absorbing heat exchanger 8). When the flow control valve 112 is closed, refrigerant does not flow through the bypass line 111 and all of the refrigerant is passed through the expansion valve 6 and the heat absorbing heat exchanger 8.

When the control valve 112 is open, refrigerant flows through the bypass line 111, passing through the flow control valve 112 and the low pressure side heat exchanger 22. Unlike in the refrigeration circuit 110 shown in FIG. 1, the refrigerant passing through the low pressure side heat exchanger 22 has not previously been passed through the heat absorbing heat exchanger 8 and has therefore not been heated. The refrigerant passing through the low pressure side heat exchanger 22 will therefore be cooler than in the FIG. 2 arrangement, where it is heated prior to passing through the low pressure side heat exchanger 22. As a result of avoiding the heat absorbing heat exchanger 8, the refrigerant that is passed to the low pressure side heat exchanger 22 in refrigeration circuit 110 will be predominantly in the liquid phase and will absorb heat energy from the working fluid of the low pressure side fluid circuit 20, causing at least a portion of the liquid refrigerant to evaporate.

In comparison to the refrigeration circuit 101 illustrated in FIG. 2, the refrigeration circuit 110 is able to provide a much greater cooling capacity. That is, the refrigeration circuit 110 has a greater capacity for cooling the working fluid in the low pressure side fluid circuit 20. This is because, when the refrigerant enters the low pressure side heat exchanger 22 in refrigeration circuit 110, it is mostly in the liquid state. This is different from the refrigerant circuit 101 shown in FIG. 2, in which the refrigerant passed to the low pressure side heat exchanger 22 will be predominantly in the gas phase. The liquid refrigerant is able to absorb a significantly greater amount of heat energy from the working fluid compared to gaseous refrigerant, and in particular can absorb enough heat energy from the working fluid in order to evaporate (i.e. the latent heat of vaporisation is removed from the working fluid). Thus, the FIG. 5 arrangement is able to provide significantly more cooling capacity than the FIG. 2 arrangement.

The controller is configured to operate the flow control valve 112 in order to control flow of refrigerant through the bypass line and the low pressure side heat exchanger 22 based on the temperature data received from the first and/or second sensors 50, 52 (as is explained further below). When one or more of the battery system 18 and the power electronic module assembly 28 require cooling, the flow control valve 112 can be opened so that refrigerant can flow through the low pressure side heat exchanger 22 in order to cool working fluid within the low pressure side fluid circuit 20. Otherwise, the flow control valve 112 may be closed to prevent refrigerant flowing through the bypass line 111. This can help to maintain optimal cooling capacity of the refrigeration circuit 110 when cooling of the battery system 18 and/or the power electronic module assembly 28 is not required.

Although not shown in FIGS. 2 and 5, the refrigeration circuits 100, 110 may comprise an accumulator for collecting refrigerant. The accumulator may be arranged downstream of the heat rejecting heat exchanger 4 for collecting liquid refrigerant output from the heat rejecting heat exchanger 4. Thus, the accumulator may be arranged on, or arranged as forming part of, the liquid line 7. The accumulator may be used to control the quantity of liquid refrigerant circulating in the refrigerant circuits 101, 110. This may vary when the transport refrigeration system 100 is used in different modes which may result in the refrigerant being cooled to a greater or lesser extent.

A method of controlling the temperature of electronic components using the transport refrigeration systems described above will now be described with reference to FIGS. 3 and 6.

During operation of the transport refrigeration system (i.e. when the compressor 2 is operating to circulate refrigerant around the refrigeration circuit 101, 110), the temperature of its electronic components can fluctuate dramatically. This can depend on a variety of factors, including ambient temperature and the set point temperature of the refrigerated compartment 106. Electronic components, such as battery systems 18, have an optimal operating temperature range and it is preferred to maintain their temperature below a maximum operating temperature.

The control system is configured to determine a temperature of the battery system 18 using the first temperature sensor 50, and a temperature of the power electronic module assembly 28 using the second temperature sensor 52. If the temperature of the battery system 18 (i.e. the internal cell temperature) is determined to be below a first threshold temperature (i.e. the battery system 18 is too cold), the control system operates the first pump 14 to circulate working fluid around the high pressure side fluid circuit 10. The control system will also operate the valve assembly 34 in the first configuration so that working fluid can be circulated around the high pressure side fluid circuit 10.

With this arrangement, the working fluid will pass through the high pressure side heat exchanger 12 where it is heated by the high pressure refrigerant in the refrigeration circuit. The working fluid will then pass to the first component heat exchanger 16 where it can be used to heat the battery system 18.

The first threshold temperature may be chosen based on the properties of the specific battery system 18 used. In one example, it may be chosen as the lowest temperature at which the battery system may discharge or re-charge. It will be appreciated that the first threshold temperature will be based on the specific operating characteristics of the battery system 18. Different battery systems, which may rely on different chemistry, may have different characteristics and require different first threshold temperatures. For an LFP battery, the first threshold temperature may be between 0° C. and 10° C. At temperatures below 0° C., it may not be possible to re-charge an LFP battery which may lead to the battery becoming fully discharged and unable to provide power to the transport refrigeration system.

If the control system determines that the temperature of the power electronic module assembly 28 exceeds a second threshold temperature (i.e. the power electronic module assembly 28 is too hot), then the control system operates the second pump 24 to circulate working fluid around the low pressure side fluid circuit 20. This will cause working fluid to pass through the low pressure side heat exchanger 22 where it is cooled by the low pressure refrigerant in the refrigeration circuit. The cooled working fluid will then be passed to the second component heat exchanger 26 where it can be used to cool the power electronic module assembly 28.

It will be appreciated that the second threshold temperature will be based on the specific type and operating characteristics of the power electronic module assembly 28. However, it is typically desired that the temperature of electronic components does not exceed 75° C. to avoid damaging the component. Hence, the second threshold temperature may be between 70° C. and 80° C.

The first pump 14 and the second pump 14 may operate independently of one another to circulate working fluid around the high pressure side fluid circuit 10 and low pressure side fluid circuit 20 respectively.

If the control system determines that the temperature of the battery system 18 (i.e. the internal cell temperature) exceeds a third threshold temperature that is higher than the first threshold temperature (i.e. the battery system 18 is too hot), then the control system will operate the controllable valve assembly 34 in the second configuration and operate the second pump 24. With this arrangement, working fluid that has been cooled through interaction with the refrigerant in the low pressure side heat exchanger 22 will be circulated around the low pressure side fluid circuit 20 through action of the second pump 24, as discussed above. In addition, at least some of the cooled working fluid from the low pressure side fluid circuit 20 will be passed to the high pressure side fluid circuit 10 via the connection pipe 30 and to the first component heat exchanger 16 in order to cool the battery system 18. After being discharged from the second component heat exchanger 16, the working fluid will be passed back to the low pressure side fluid circuit 20 via the connection pipe 32.

Figure 6:
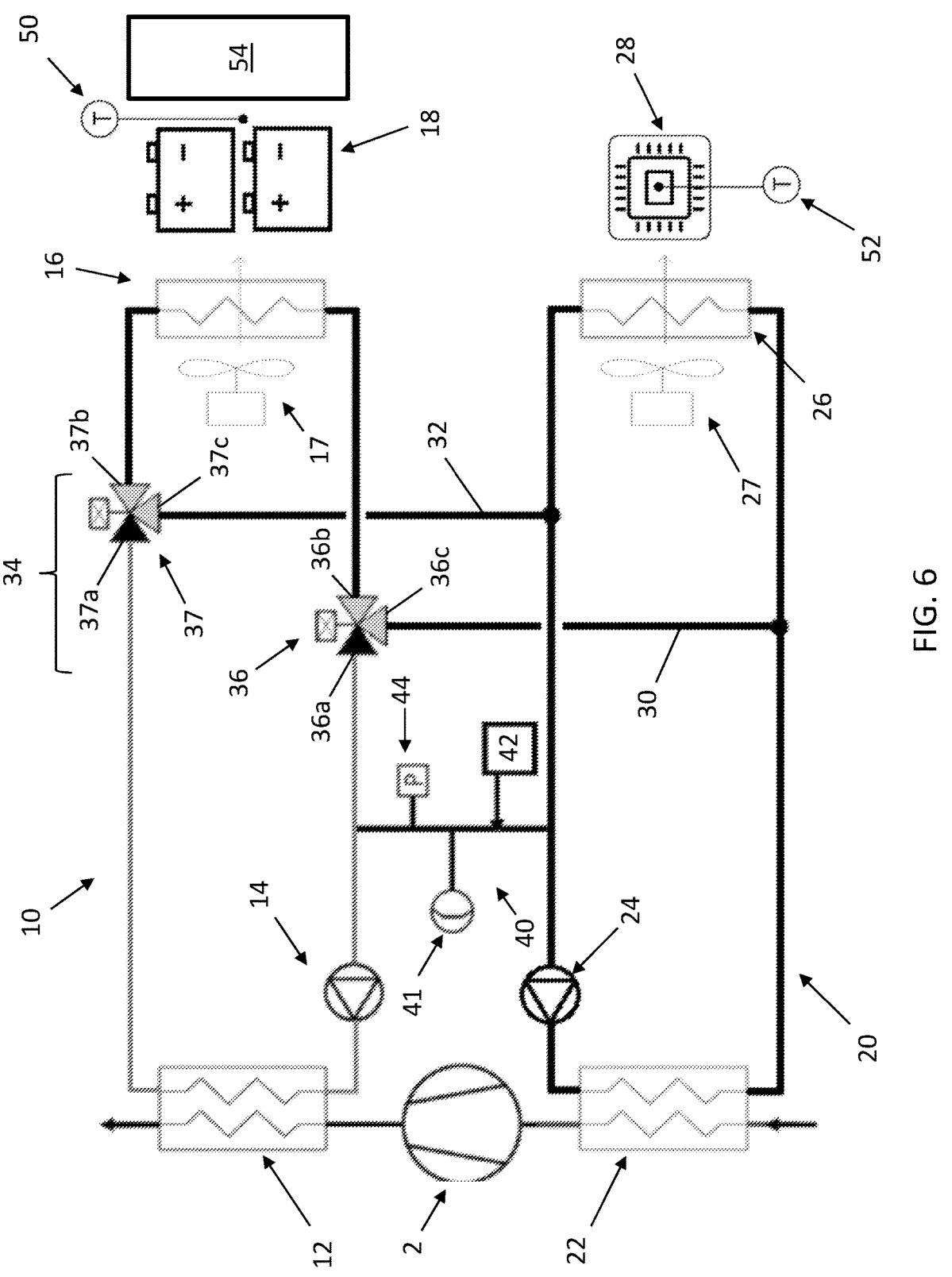
FIG. 6 shows the thermal management system of FIG. 3 in a cooling mode of operation.

The path that the working fluid takes through the thermal management system 102 in this configuration is shown in FIG. 6, with thick lines indicating the flow path of the working fluid that is circulated by the second pump 24. The thin lines indicate the parts of the thermal management system 102 where, in this configuration, the working fluid does not circulate.

With this configuration, the thermal management system 102 can be used to cool the power electronic module assembly 28 (i.e. via the second component heat exchanger 26) as well as the battery system 18 (i.e. via the first component heat exchanger 16).

The third threshold temperature may be chosen to prevent the battery system 18 from exceeding a maximum working temperature. If the battery system 18 were to become too hot, it may become damaged or less efficient. It will be appreciated that, similar to the first threshold temperature, the third threshold temperature may be chosen based on the properties of the specific battery system 18 used. For LFP batteries, the third threshold temperature may be between 30° C. and 40° C.

If the controller determines that the temperature of the battery system 18 is not above the third threshold temperature (i.e. so there is no need to cool the battery system 18) but that the temperature of the power electronic module assembly 28 exceeds the second threshold temperature (i.e. so there is a need to cool the power electronic module assembly 28), then the control system will operate the second pump 24 (as discussed above) and operate the controllable valve assembly 34 in the first configuration. As a result, the high pressure side fluid circuit 10 and the low pressure side fluid circuit 20 will not be fluidly connected via the connection pipes 30, 32 so that working fluid can be circulated around the low pressure side fluid circuit 20 independently of working fluid being circulated around the high pressure side fluid circuit 10. This means that, if necessary, the thermal management system can be used to cool the power electronic module assembly 28 without cooling the battery system 18. This may be required, for example, if the battery system 18 is within its optimum working temperature range but the power electronic module assembly 28 has become too hot, e.g. so that it may become damaged.

Also, when the controllable valve assembly 34 is in the first configuration, the thermal management system may be used, if necessary, to heat the battery system 18 whilst also cooling the power electronic module assembly 28. This can be achieved by operating both the first and second pumps 14, 24 to circulate working fluid around the respective high pressure side and low pressure side fluid circuits 10, 20 (as discussed above), as required depending on the respective temperatures of the battery system 18 and the power electronic module assembly 28.

When the transport refrigeration system 100 comprises the refrigeration circuit 110 shown in FIG. 5, it may also be necessary to adjust operation of the refrigeration circuit 110 in order to enable the thermal management system 102 to provide a cooling function. The control system is arranged to open the flow control valve 112 to allow refrigerant to flow through the bypass line 111 and the low pressure side heat exchanger 22 if the temperature of the power electronic module assembly 24 exceeds the second threshold temperature and/or if the temperature of the battery system 18 exceeds the third threshold temperature. In this way, refrigerant can be passed to the low pressure side heat exchanger 22 in the bypass line 111 and the working fluid passing through the low pressure side heat exchanger 22 can be cooled by the refrigerant.

No such additional control of the refrigeration circuit 101 may be required when the transport refrigeration circuit 100 comprises the refrigeration circuit 101 shown in FIG. 2. This is because the refrigerant will pass through the low pressure side heat exchanger 22 at all times during normal operation of the refrigeration circuit 101.

The control system may operate the heater 54 to provide additional heating to the battery system 18 if/when it is required. This may be needed, for example, if the control system determines that the first pump 14 has been operated for a predetermined period of time, and the temperature of the battery system 18 is (still) less than the first threshold temperature. If the predetermined period of time has passed without the temperature of the battery system 18 rising sufficiently, then the control system may be configured to activate the heater 54. In other words, if the control system determines that the battery system 18 is too cold even when the thermal management system 102 has been/is being operated to provide heat to the battery system 18, the control system will activate the heater to provide additional heat and speed up the heating process.

Alternatively, or additionally, the control system may be configured to activate the heater 54 if it is determined that the temperature of the battery system 18 is less than a fourth threshold temperature that is lower than the first threshold temperature. Much like the first and third threshold temperatures, the fourth threshold temperature may be based on the characteristics of the specific battery system 18 used. For an LFP battery, the fourth threshold temperature may be between −20° C. and −10° C.

In other words, if the control system determines that the battery system 18 is significantly colder than its preferred operating temperature, then it may activate the heater 54 at the same time as operating the first pump 14 in order to provide increased heating. The control system may deactivate/stop operating the heater 54 when it is determined that the temperature of the battery system 18 has increased to above the first threshold temperature or the fourth threshold temperature, or may deactivate/stop operating the heater 54 after a predetermined period of time.

The transport refrigeration system 100 may comprise a radiator (not shown) that is arranged in a flow path of ambient air to provide cooling for e.g. engine coolant. In transport refrigeration systems that are powered by internal engines, the radiator may be used to cool the engine coolant. The radiator may still be present in electric transport refrigeration systems which do not have an internal combustion engine, but this radiator is typically unused since it is no longer required to cool engine coolant.

The radiator may be fluidly connected to the low pressure side fluid circuit 20 in order to provide additional cooling to the working fluid of the low pressure side fluid circuit 20.

Alternatively, or additionally, the radiator may be fluidly connected to the high pressure side fluid circuit 10 in order to provide additional heating to the working fluid of the high pressure side fluid circuit 10. As the ambient air passes over the radiator, it will exchange heat with the working fluid flowing through the radiator in order to heat or cool the working fluid, depending on the relative temperatures of the air and the working fluid.

The radiator and the heat rejecting heat exchanger 4 of the refrigeration circuit 101, 110 may be arranged within a shared heat exchanger housing that is placed within a flow path of ambient air for cooling or heating working fluid passing through the radiator and cooling refrigerant within the heat rejecting heat exchanger 4. Although the radiator and the heat rejecting heat exchanger 4 are housed within the same shared housing, they are not in fluid communication so the working fluid and refrigerant does not mix within the housing.

The radiator may be fluidly connected to the low pressure side fluid circuit 20 via a low pressure side radiator valve. When the low pressure side radiator valve is open, working fluid may pass from the low pressure side fluid circuit 20 to the radiator and back to the low pressure side fluid circuit 20. When the low pressure side radiator valve is closed, working fluid is prevented from passing from the low pressure side fluid circuit 20 to the radiator.

Alternatively, or additionally, the radiator may be fluidly connected to the high pressure side fluid circuit 10 via a high pressure side radiator valve. When the high pressure side radiator valve is open, working fluid may pass from the high pressure side fluid circuit 10 to the radiator and back to the high pressure side fluid circuit 10. When the high pressure side radiator valve is closed, working fluid is prevented from passing from the high pressure side fluid circuit 10 to the radiator.

The flow of ambient air over the shared heat exchanger housing may be generated by movement of the transport refrigeration system 100 through the air and/or the transport refrigeration system 100 may comprise a fan to drive/draw ambient air across the shared heat exchanger housing and across the radiator and the heat rejecting heat exchanger.

The radiator can be used to provide additional cooling capacity when the temperature of the ambient air is below the temperature of the battery system 18 and/or the power electronic module assembly 28. The radiator can also be used to provide additional heating capacity when the temperature of the ambient air is above the temperature of the battery system 18. Accordingly, the control system may be configured to control the low pressure radiator valve and/or the high pressure radiator valve based on the temperature of the ambient air relative to at least one of the battery system 18 and the power electronic module assembly 28.

To help control operation of the high and low pressure side radiator valves, the control system may comprise an ambient temperature sensor for measuring a temperature of the ambient air. The controller of the control system may be configured to receive temperature data from the ambient temperature sensor.

The control system may be configured to, when cooling is required (i.e. the temperature of the electronic module assembly 28 is above the second threshold temperature and/or the temperature of the battery system 18 is above the third threshold temperature), open the low pressure side radiator valve in response to determining that a temperature of the ambient air is below the temperature of the power electronic module assembly 28 and/or the temperature of the battery system 18. This will allow working fluid to pass from the second component heat exchanger 26 and/or the first component heat exchanger 16 to the radiator via the low pressure side fluid circuit 20 (before or after being passed to the low pressure side heat exchanger 22) to provide additional cooling of the working fluid before it is passed back to the second component heat exchanger 26 and/or the first component heat exchanger 16 for cooling of the power electronic module assembly 28 and/or the battery system 18. The control system may be arranged to close (or keep closed) the low pressure side radiator valve when the temperature of the ambient air is above the temperature of the power electronic module assembly 28 and/or the battery system 18.

The control system may be configured to, when heating is required (i.e. when the temperature of the battery system 18 is below the first threshold temperature), open the high pressure side radiator valve in response to determining that the temperature of the ambient air is above the temperature of the battery system 18. this will allow working fluid to pass from the first component heat exchanger 16 to the radiator via the high pressure side fluid circuit 10 (before or after being passed to the high pressure side heat exchanger 12) to provide additional heating of the working fluid before being passed back to the first component heat exchanger 16 for heating of the battery system 18. The control system may be arranged to close (or keep closed) the high pressure side radiator valve when the temperature of the ambient air is below the temperature of the battery system 18.

While the invention has been described in detail in connection with only a limited number of embodiments, it should be readily understood that the invention is not limited to such disclosed embodiments. Rather, the invention can be modified to incorporate any number of variations, alterations, substitutions, or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description but is only limited by the scope of the appended claims.

The invention claimed is:

1. A transport refrigeration system comprising:
a refrigeration circuit comprising a compressor for compressing a refrigerant, a high pressure side heat exchanger arranged on a high pressure side of the compressor for removing heat from the refrigerant, and a low pressure side heat exchanger arranged on a low pressure side of the compressor for heating the refrigerant; and
a thermal management system comprising:
a high pressure side fluid circuit comprising a first pump for circulating a working fluid around the high pressure side fluid circuit, and a first component heat exchanger for heating and/or cooling a first electronic component, wherein the high pressure side fluid circuit is arranged in a heat exchange relationship with the refrigeration circuit via the high pressure side heat exchanger for heating the working fluid within the high pressure side fluid circuit;
a low pressure side fluid circuit comprising a second pump for circulating the working fluid around the low pressure side fluid circuit, and a second component heat exchanger for cooling a second electronic component via convection, wherein the low pressure side fluid circuit is arranged in a heat exchange relationship with the refrigeration circuit via the low pressure side heat exchanger for cooling the working fluid within the low pressure side fluid circuit; and
a pressure compensation system comprising an expansion tank configured to absorb excess pressure in the thermal management system resulting from thermal expansion of the working fluid.

2. The transport refrigeration system of claim 1, wherein the thermal management system further comprises:
connection piping for fluidly connecting the high pressure side and low pressure side fluid circuits; and
a controllable valve assembly arranged to selectively allow the working fluid to pass between the high pressure side and low pressure side fluid circuits via the connection piping,
wherein the controllable valve assembly is configured to selectively switch between a first configuration in which the working fluid is prevented from passing between the high pressure side and low pressure side fluid circuits via the connection piping, and a second configuration in which the working fluid is able to pass from the low pressure side fluid circuit to the first component heat exchanger via the connection piping.

3. The transport refrigeration system of claim 2, wherein the connection piping and the controllable valve assembly are arranged such that, in the second configuration, the working fluid from the low pressure side fluid circuit is prevented from passing to the first pump and the high pressure side heat exchanger.

4. The transport refrigeration system of claim 1, wherein the refrigeration circuit further comprises:
a heat rejecting heat exchanger arranged on the high pressure side of the compressor for removing heat from a high pressure refrigerant output by the compressor;
an expansion device arranged downstream of the heat rejecting heat exchanger for reducing the pressure of a cooled refrigerant output by the heat rejecting heat exchanger, wherein the expansion device is a valve; and
a heat absorbing heat exchanger arranged downstream of the expansion device for heating a low pressure refrigerant output by the expansion device.

5. The transport refrigeration system of claim 4, wherein the high pressure side heat exchanger is arranged upstream of the heat rejecting heat exchanger.

6. The transport refrigeration system of claim 4, wherein the low pressure side heat exchanger is arranged downstream of the heat absorbing heat exchanger.

7. The transport refrigeration system of claim 4, wherein the refrigeration circuit further comprises:
a bypass line arranged to direct the refrigerant output by the heat rejecting heat exchanger to the low pressure side of the compressor downstream of the heat absorbing heat exchanger, thereby providing a flow path for the refrigerant to bypass the expansion device and the heat absorbing heat exchanger,
wherein the bypass line comprises a flow control valve for controlling the flow rate and pressure of the refrigerant in the bypass line, and
wherein the low pressure side heat exchanger is arranged in the bypass line downstream of the flow control valve.

8. The transport refrigeration system of claim 1, further comprising a power source for providing electrical power to the transport refrigeration system, wherein the first component heat exchanger is arranged for heating and/or cooling the power source, and wherein the power source is a battery system.

9. The transport refrigeration system of claim 2, further comprising a control system for obtaining temperature data and controlling operation of the transport refrigeration system, wherein the control system is configured to:

operate the first pump if a temperature of the first electronic component is less than a first threshold temperature; and/or operate the second pump if a temperature of the second electronic component exceeds a second threshold temperature.

10. The transport refrigeration system of claim 9, wherein the control system is further configured to:

operate the controllable valve assembly in the first configuration if a temperature of the first electronic component is less than or equal to a third threshold temperature that is higher than the first threshold temperature; and/or operate the controllable valve assembly in the second configuration and operate the second pump if a temperature of the first electronic component exceeds a third threshold temperature that is higher than the first threshold temperature.

11. The transport refrigeration system of claim 10, wherein:

the first threshold temperature is between at least one of −20° C. and 20° C., and between 0° C. and 10° C.; and/or the second threshold temperature is between at least one of 50° C. and 90° C., and between 70° C. and 80° C.; and/or the third threshold temperature is between at least one of 20° C. and 50° C., and between 30° C. and 40° C.

12. The transport refrigeration system of claim 1, wherein the thermal management system further comprises a radiator in fluid communication with the low pressure side fluid circuit for cooling the working fluid within the low pressure side fluid circuit, and wherein the radiator is fluidly connected to the low pressure side fluid circuit via a low pressure side radiator valve arranged to selectively allow the working fluid to pass between the low pressure side fluid circuit and the radiator.

13. A method of controlling the temperature of electronic components using the transport refrigeration system of claim 1, wherein the first component heat exchanger is arranged for heating and/or cooling a first electronic component, and the second component heat exchanger is arranged for cooling a second electronic component, the method comprising:

determining a temperature of the first electronic component;

determining a temperature of the second electronic component;

operating the first pump to circulate working fluid around the high pressure side fluid circuit if the temperature of the first electronic component is less than a first threshold temperature; and/or operating the second pump to circulate working fluid around the low pressure side fluid circuit if the temperature of the second electronic component exceeds a second threshold temperature.

14. The method of claim 13, wherein when the low pressure side heat exchanger is arranged in a bypass line of the refrigeration circuit, the method comprises: opening a flow control valve to allow the refrigerant to flow through the bypass line if the temperature of the second electronic component exceeds the second threshold temperature and/or if the temperature of the first electronic component exceeds a third threshold temperature that is higher than the first threshold temperature.

15. The method of claim 13, further comprising:

operating a controllable valve assembly in a first configuration if the temperature of the first electronic component is less than or equal to a third threshold temperature that is higher than the first threshold temperature; and/or operating the controllable valve assembly in a second configuration and operating the second pump if the temperature of the first electronic component exceeds a third threshold temperature that is higher than the first threshold temperature.

16. The transport refrigeration system of claim 1, wherein the thermal management system further comprises:

a radiator fluidly connected to at least one of the high pressure side fluid circuit and the low pressure side fluid circuit; and a control system configured to operate one or more radiator valves to allow or restrict flow of the working fluid through the radiator based on a comparison between an ambient air temperature and a temperature of the first electronic component or a temperature of the second electronic component.

17. The transport refrigeration system of claim 1, wherein the expansion tank is fluidly connected to both the high pressure side fluid circuit and the low pressure side fluid circuit via a conduit.

18. The transport refrigeration system of claim 16, wherein the control system is further configured to activate an electric heater for heating the first electronic component if the temperature of the first electronic component remains below a threshold after a predefined time of pump operation.

19. The transport refrigeration system of claim 1, wherein the second component heat exchanger is arranged in a second airflow path driven by a second fan, and wherein the second fan is arranged to drive or draw air over the second component heat exchanger and the second electronic component.

20. The transport refrigeration system of claim 1, wherein the first component heat exchanger is arranged in a first linear airflow path driven by a first fan such that the first fan is arranged to drive or draw air over the first component heat exchanger and the first electronic component for heating and/or cooling the first electronic component by convection.

* * * * *